UNITED STATES PATENT OFFICE.

JOHN F. McCULLY, OF GONZALES COUNTY, TEXAS.

IMPROVEMENT IN THE MANUFACTURE OF BLACK BOTTLE-GLASS.

Specification forming part of Letters Patent No. 15,665, dated September 2, 1856.

*To all whom it may concern:*

Be it known that I, JOHN F. McCULLY, of Gonzales county, in the State of Texas, have invented a new and useful Improvement in the Manufacture of Black Bottle-Glass, consisting of a new composition of materials for the production of that article; and I do hereby declare the following to be a full, clear, and exact description thereof.

My invention consists in the peculiar mode hereinafter described of using, in combination with other ingredients, an earthy slate of a peculiar character, called "clay-slate," for the purpose of furnishing the coloring-matter of the glass, as well as forming one of the bases of the glass itself. The chemical analysis of this clay-slate, as nearly as it could be obtained, gives: silicate, seventy-eight and eight-tenths of one per cent.; oxide of iron, seven and eight-tenths of one per cent.; alumina, nine and eight-tenths of one per cent.; carbonate of lime, five-tenths of one per cent.; phosphate of lime, three-tenths of one per cent.; peroxide manganese, eight-tenths of one per cent., and oxide of manganese, two per cent., in one hundred parts. This ingredient, which contains some of the essential elements in the manufacture of glass, has never been successfully used for that purpose, owing to the difficulty of so adjusting it with the other bases as to produce a good article with any tolerable degree of certainty, and I therefore claim to be the first to invent a method of using it successfully. This clay-slate is found in the neighborhood of Pittsburg, in the State of Pennsylvania, and in various other parts of the Union.

The glass manufactured with this new ingredient as one of its bases on my plan possesses many superior advantages, which I will proceed to enumerate. It exerts, when in a state of fusion, less corrosive action on the pots or crucibles in which it is melted than the ordinary preparation or "mix" for black glass. It is more free from bubbles and imperfections, has a brighter luster, and is more ductile when hot, and thus more readily worked. The mix prepared by me, and which I will proceed to describe, has also some great advantages over that ordinarily used, independent of the superiority of the glass which it produces. One of these, most important to the manufacturer, is that the mix invented by me will fuse much more rapidly than the mix ordinarily used. It ordinarily takes from eighteen to nineteen hours to melt a batch of glass which it would only take about nine hours to work up into bottles, &c., and this causes a great loss of time and involves the use of a larger number of furnaces than would otherwise be required. My mix, however, will fuse so as to be ready for working in about fourteen hours. This is owing to the fact that the presence of the new ingredient mentioned enables me to reduce the quantity of lime, as the new ingredient itself facilitates the melting, thereby avoiding the evils arising from excess of lime, and this change, so far from injuring the color of the glass, improves it, as this new ingredient forms not only an important base, but imparts color to the glass. Another advantage is that more glass can be produced by my mix from the same quantity of sand than in the ordinary mix, and that the glass thus produced can be worked with a colder furnace than any other natural black glass. It is also a great advantage that the coloring-matter is imparted by the articles which form the bases of the glass, and not, as is usual, by the addition of lime in excess, which, while it is necessary in the ordinary mixes to produce the color, must be worked at a higher temperature, and then produces an inferior glass to mine.

In order to enable others skilled in the art to make and use my improved composition of materials or mix for the manufacture of black glass, I will proceed to describe the ingredients composing it and the proportions to be used.

Silica, which forms the base of glass, is of itself infusible, but by the admixture of potash, soda, or some equivalent alkali, it becomes capable of vitreous fusion, and forms what we call "glass." To these are added various other substances—as lime, charcoal, salt, oxides of lead, of iron, or of manganese—according to the kind and quality of glass to be made.

The ordinary ingredients for the manufacture of black glass are sand, (for the silica,) common salt, and slaked lime. The quantity of each of the ingredients to be used varies with the quality of the articles themselves and the kind of furnace, and the exact proportion is regulated better by practice than by theory. The mix which I use consists of sand, soda-ash, (or pearlash,) lime, common salt, and clay-slate, the ingredient before referred to. These are to be mixed together into a batch in the following proportions: sand, one hundred parts; soda-ash, forty-one and one-half to twenty-eight parts; lime, (slaked,) forty-six to fifty-six parts; common salt, seven and one-half to twelve parts, and clay-slate, thirty to thirty-eight parts. Of the two proportions just given the former is the one I find most useful for a large furnace and for the quality of materials in use where I have had the experiments conducted. The last-mentioned proportions are better suited for a small furnace.

For the benefit of practical glass-manufacturers I will state further that a mix composed of four thousand two hundred pounds of sand, one thousand seven hundred and forty pounds of soda, one thousand six hundred and fifty pounds of clay slate, three hundred and five pounds of salt, and one thousand nine hundred and forty-five pounds of lime (or forty-eight bushels) form an excellent batch for a large furnace. The clay-slate may be put into the batch with the other ingredients without being ground or pulverized, as the burning in the preparation-oven reduces it sufficiently. This quantity will make forty gross of one-sixth-gallon wine-bottles, weighing eighty hundredweight. The ingredients composing the mix as just given are to be well combined and then burned for about twenty-four hours in a preparation-oven of the ordinary kind used for burning the batch. When thus burned, and while red hot, it is taken from the oven and placed in a pot in the furnace, where it is fused in the ordinary way, and will be ready for use in about fourteen hours from the time it is put in the furnace.

As already stated, I do not confine myself to the exact proportion of ingredients mentioned, because no precise rule can be given, as the proportions must vary in different instances. To suit the varying quality of sand used, the strength and quality of the alkalies, the size of the crucibles or pots, the heat and draft of the furnace, and the kind and quality of glass to be made, for instance, the sand may contain more or less loam. If more loam is present, less alkali will be required, and vice versa. If the crucibles used are large, the ingredients are not so immediately acted upon by the fire, and will require more soda to facilitate and expedite the fluxing, and if the glass is desired to be more or less opaque it will be advisable to reduce or increase the amount of lime and clay-slate.

Having thus described my improved mix or composition of materials for the manufacture of black glass, I distinctly declare that I do not claim as new the process of preheating the batch as applied to the ingredients heretofore used for making black glass, but only as applied to and necessary for the batch if the above specified clay-slate is used as one of its constituent ingredients.

What therefore I claim as new, and desire to secure by Letters Patent, is—

The introduction of the above-specified clay-slate as one of the ingredients in compounding the usual batch for the manufacture of black glass, in the proportion and in the manner and for the purposes substantially as specified.

In testimony whereof I have hereunto set my hand this 7th day of November.

JOHN F. McCULLY.

Witnesses:
WM. N. HOWARD,
R. A. HOWARD.